US012669065B2

(12) United States Patent
Little et al.

(10) Patent No.: US 12,669,065 B2
(45) Date of Patent: Jun. 30, 2026

(54) GAS TURBINE COMPRESSOR COOLED SYNC RING BUMPER

(71) Applicant: RTX Corporation, Farmington, CT (US)

(72) Inventors: Jonathan D. Little, West Hartford, CT (US); Tyler C. Cox, Weathersfield, CT (US); Bernard W. Pudvah, Portland, CT (US); Matthew G. Rennie, East Hampton, CT (US); William W. Frank, Cheshire, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/982,091

(22) Filed: Dec. 16, 2024

(65) Prior Publication Data

US 2026/0168391 A1 Jun. 18, 2026

(51) Int. Cl.

*F01D 17/14* (2006.01)
*F01D 17/16* (2006.01)
*F01D 25/24* (2006.01)

(52) U.S. Cl.

CPC ............. *F01D 17/14* (2013.01); *F01D 17/16* (2013.01); *F01D 25/24* (2013.01); *F05D 2220/32* (2013.01); *F05D 2230/60* (2013.01); *F05D 2240/12* (2013.01); *F05D 2260/60* (2013.01)

(58) Field of Classification Search

CPC .......... F01D 17/14; F01D 17/16; F01D 25/24; F05D 2260/20

See application file for complete search history.

(56) References Cited

U.S. PATENT DOCUMENTS

| | | | | |
|---|---|---|---|---|
| 4,925,364 | A * | 5/1990 | Das | F16B 39/12 411/383 |
| 7,198,454 | B2 | 4/2007 | Evans | |
| 8,734,090 | B2 | 5/2014 | Lewis | |
| 8,864,450 | B2 | 10/2014 | Gasmen et al. | |
| 9,353,644 | B2 * | 5/2016 | LeBlanc | F01D 17/162 |
| 9,617,969 | B2 | 4/2017 | LeBlanc et al. | |
| 10,364,828 | B2 * | 7/2019 | Ikeguchi | F04D 29/563 |
| 11,105,219 | B2 * | 8/2021 | Ward | F01D 25/24 |
| 2005/0106010 | A1 * | 5/2005 | Evans | F01D 17/162 415/160 |
| 2006/0013683 | A1 * | 1/2006 | Martindale | F01D 25/24 415/191 |
| 2009/0162192 | A1 | 6/2009 | McCaffrey | |

(Continued)

FOREIGN PATENT DOCUMENTS

EP 3789590 A1 10/2021

OTHER PUBLICATIONS

Extended European Search Report for counterpart EP Application No. 25207751.6 dated Mar. 16, 2026.

*Primary Examiner* — Courtney D Heinle
*Assistant Examiner* — Cameron A Corday
(74) *Attorney, Agent, or Firm* — Bachman & LaPointe, P.C.

(57) ABSTRACT

A case mounted bumper pad including a case contact region supporting a runner pad support; the case contact region is in operative communication with the case, the runner pad support is in operative communication with a runner pad, the runner pad is in operative communication with a sync ring of a variable vane; and a gap formed in the bumper pad proximate the case.

14 Claims, 4 Drawing Sheets

(56) References Cited

U.S. PATENT DOCUMENTS

| | | | |
|---|---|---|---|
| 2014/0234082 | A1 | 8/2014 | LeBlanc et al. |
| 2016/0303693 | A1 | 10/2016 | Pickens |
| 2020/0102838 | A1* | 4/2020 | Vu .......................... F01D 5/187 |

* cited by examiner

GAS TURBINE COMPRESSOR COOLED SYNC RING BUMPER

This invention was made with Government support awarded by the United States. The government has certain rights in this invention.

BACKGROUND

The present disclosure is directed to the improved case mounted bumper pads.

The last stage of a gas turbine compressor variable vane is typically actuated by a sync ring rotating on bumper pads contacting the compressor case. The design includes a composite low friction runner pad contacting a metallic surface on the case to reduce loads and improve durability.

As compressor design advances, the aft stage variable vane is getting hotter to facilitate performance improvement. Temperatures currently exceed the max temp of typical runner materials, such as polyimide composites, resulting in durability issues. The polyimide composite starts to oxidize when exposed to operational temperatures with a potential loss of structural integrity.

SUMMARY

In accordance with the present disclosure, there is provided a case mounted bumper pad comprising a case contact region supporting a runner pad support; the case contact region is in operative communication with the case, the runner pad support is in operative communication with a runner pad, the runner pad is in operative communication with a sync ring of a variable vane; and a gap formed in the bumper pad proximate the case.

A further embodiment of any of the foregoing embodiments may additionally and/or alternatively include the gap is configured to accommodate cooling air in the gap and provide for the removal of thermal energy from the bumper pad.

A further embodiment of any of the foregoing embodiments may additionally and/or alternatively include the bumper pad is configured to reduce the heat transfer from the case to the runner pad.

A further embodiment of any of the foregoing embodiments may additionally and/or alternatively include the gap is configured to prevent the runner pad from being heated to a predetermined temperature.

A further embodiment of any of the foregoing embodiments may additionally and/or alternatively include the predetermined temperature comprises a thermal oxidation temperature of the runner pad.

A further embodiment of any of the foregoing embodiments may additionally and/or alternatively include the gap comprises dimensions tailored for a predetermined quantity of cooling air flow rate to cool the bumper pad.

A further embodiment of any of the foregoing embodiments may additionally and/or alternatively include the dimensions comprise at least one of a gap height, a gap width, and a gap depth configured for a predetermined quantity of cooling air flow through the gap.

In accordance with the present disclosure, there is provided a gas turbine compressor section case mounted bumper pad comprising a compressor variable vane in operative communication with a sync ring; the sync ring mounted on the bumper pad; the bumper pad mounted on the case; a runner pad between the sync ring and the bumper pad; the bumper pad comprising a case contact region supporting a runner pad support; the case contact region is in operative communication with the case, the runner pad support is in operative communication with the runner pad, the runner pad is in operative communication with the sync ring of the variable vane; and a gap formed in the bumper pad proximate the case.

A further embodiment of any of the foregoing embodiments may additionally and/or alternatively include the gap is configured to flow cooling air to pass through the gap and provide for the removal of thermal energy from the bumper pad.

A further embodiment of any of the foregoing embodiments may additionally and/or alternatively include the gap is configured to prevent the runner pad from being heated to a predetermined temperature.

A further embodiment of any of the foregoing embodiments may additionally and/or alternatively include the gap comprises dimensions tailored to allow for a predetermined quantity of cooling air flow rate for cooling to the bumper pad.

A further embodiment of any of the foregoing embodiments may additionally and/or alternatively include the gas turbine compressor section case mounted bumper pad further comprising a surface feature formed in the bumper pad, wherein the surface feature is configured to increase surface area of the bumper pad exposed to a cooling air flow.

A further embodiment of any of the foregoing embodiments may additionally and/or alternatively include the bumper pad comprises a thickness dimension configured to provide structural support to the runner pad and the sync ring; and the bumper pad comprises material properties configured with a predetermined heat transfer rate to the runner pad.

In accordance with the present disclosure, there is provided a process of forming a gas turbine compressor section case mounted bumper pad comprising placing a compressor variable vane in operative communication with a sync ring; mounting the sync ring on the bumper pad; mounting the bumper pad on the case; coupling a runner pad between the sync ring and the bumper pad; the bumper pad comprising a case contact region supporting a runner pad support; coupling the case contact region in operative communication with the case; coupling the runner pad support in operative communication with the runner pad; coupling the runner pad in operative communication with the sync ring of the variable vane; and forming a gap in the bumper pad proximate the case.

A further embodiment of any of the foregoing embodiments may additionally and/or alternatively include the process further comprises configuring the gap to flow cooling air passing through the gap; and providing for the removal of thermal energy from the bumper pad.

A further embodiment of any of the foregoing embodiments may additionally and/or alternatively include the process further comprising configuring the gap to prevent the runner pad from being heated to a predetermined temperature.

A further embodiment of any of the foregoing embodiments may additionally and/or alternatively include the process further comprising tailoring the gap with dimensions allowing for a predetermined quantity of cooling air flow for cooling to the bumper pad.

A further embodiment of any of the foregoing embodiments may additionally and/or alternatively include the process further comprising forming the bumper pad with a thickness dimension configured to provide structural support to the runner pad and the sync ring; and configuring the bumper pad with a material property having a predetermined heat transfer rate to the runner pad.

A further embodiment of any of the foregoing embodiments may additionally and/or alternatively include the process further comprising forming a surface feature in the bumper pad; configuring the surface feature to increase surface area of the bumper pad exposed to a cooling air flow.

A further embodiment of any of the foregoing embodiments may additionally and/or alternatively include the process further comprising forming the bumper pad with dimensions comprising at least one of a gap height, a gap width, and a gap depth configured for a predetermined quantity of cooling air flow through the gap.

Other details of the case mounted bumper pad are set forth in the following detailed description and the accompanying drawings wherein like reference numerals depict like elements.

DETAILED DESCRIPTION

Figure 1:
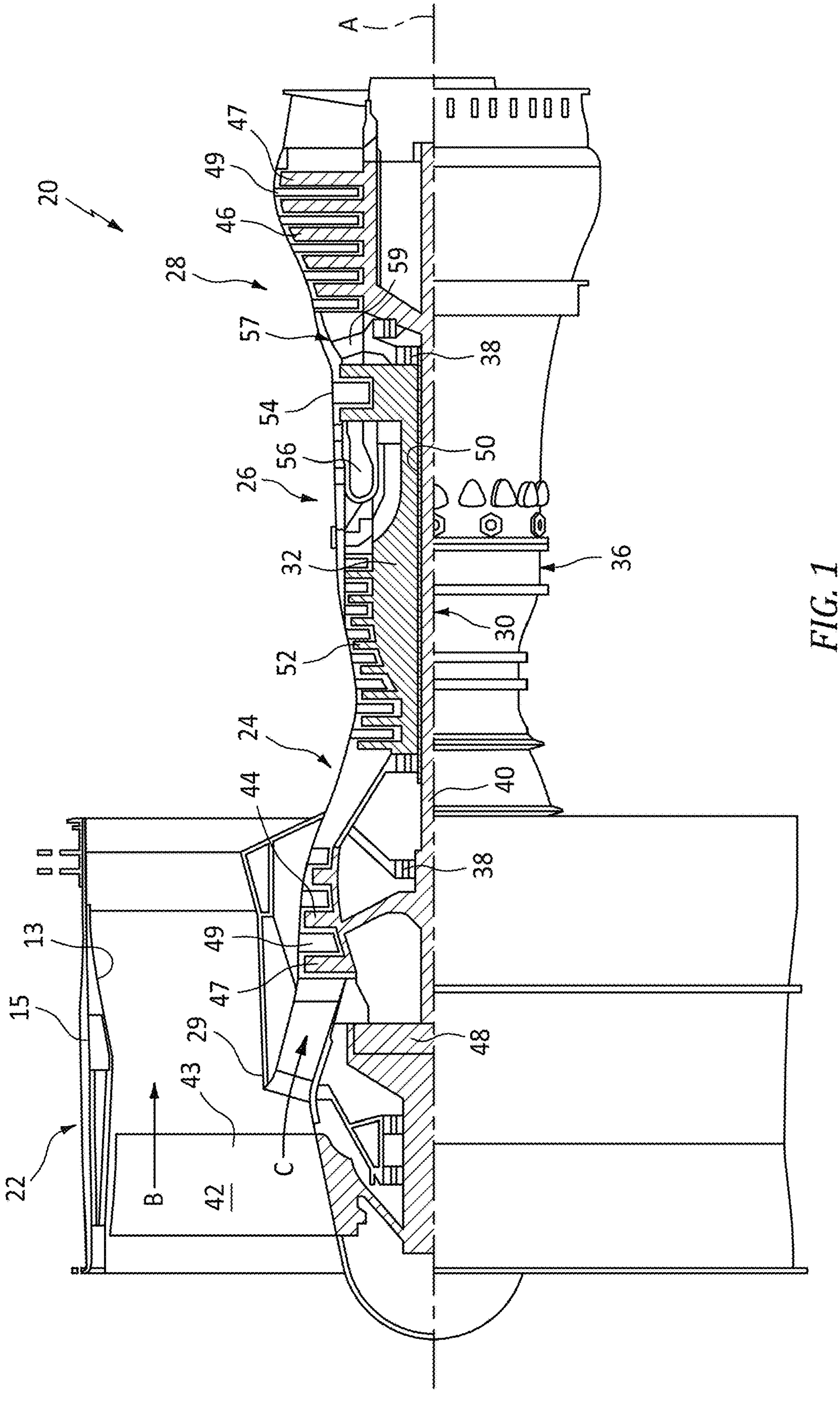
FIG. 1 is a cross section view of an exemplary gas turbine engine.
Figure 2:
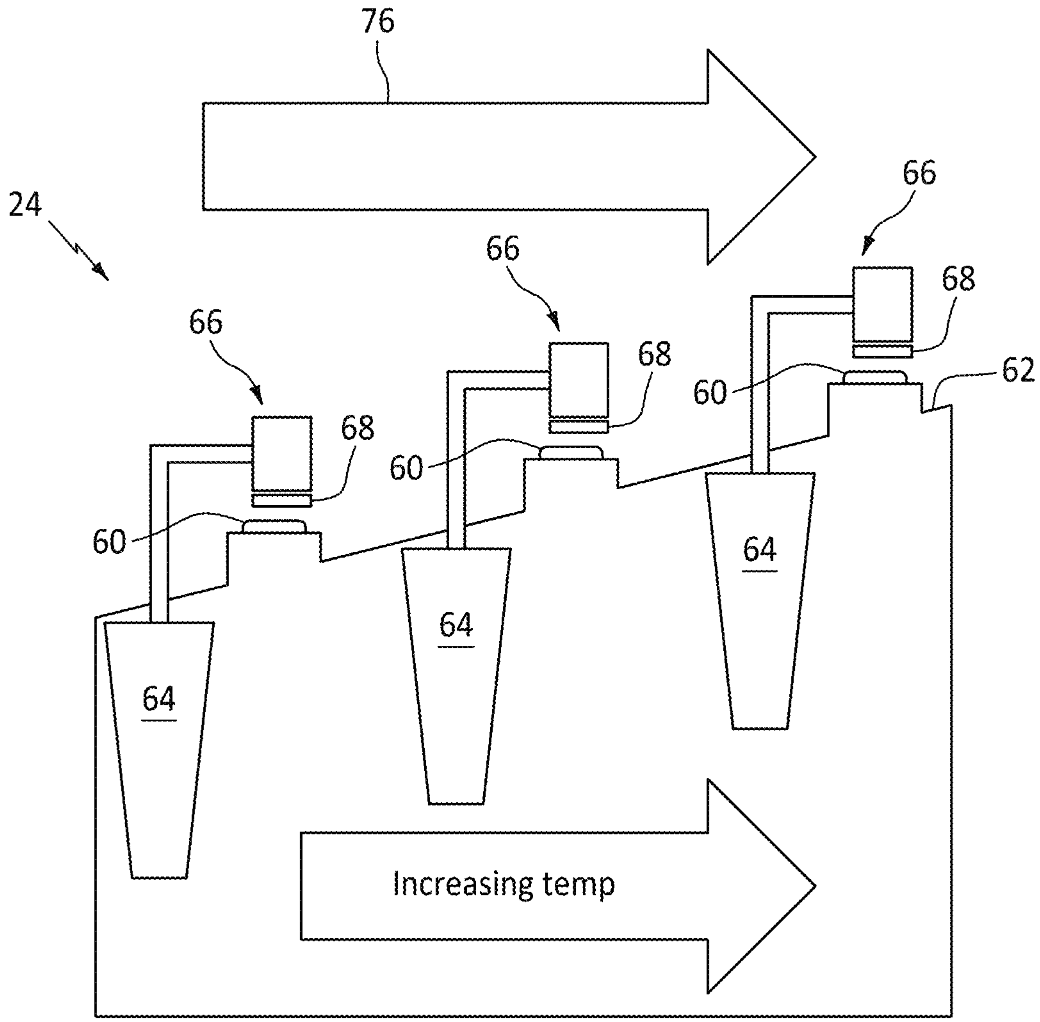
FIG. 2 is a schematic representation of an exemplary compressor section with compressor variable vanes.
Figure 3:
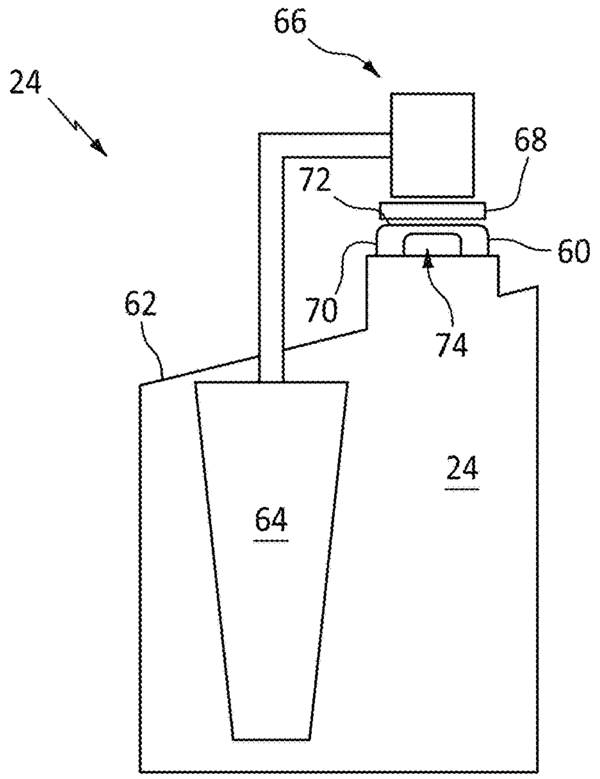
FIG. 3 is a schematic representation of an exemplary compressor variable vane with sync ring.
Figure 4:
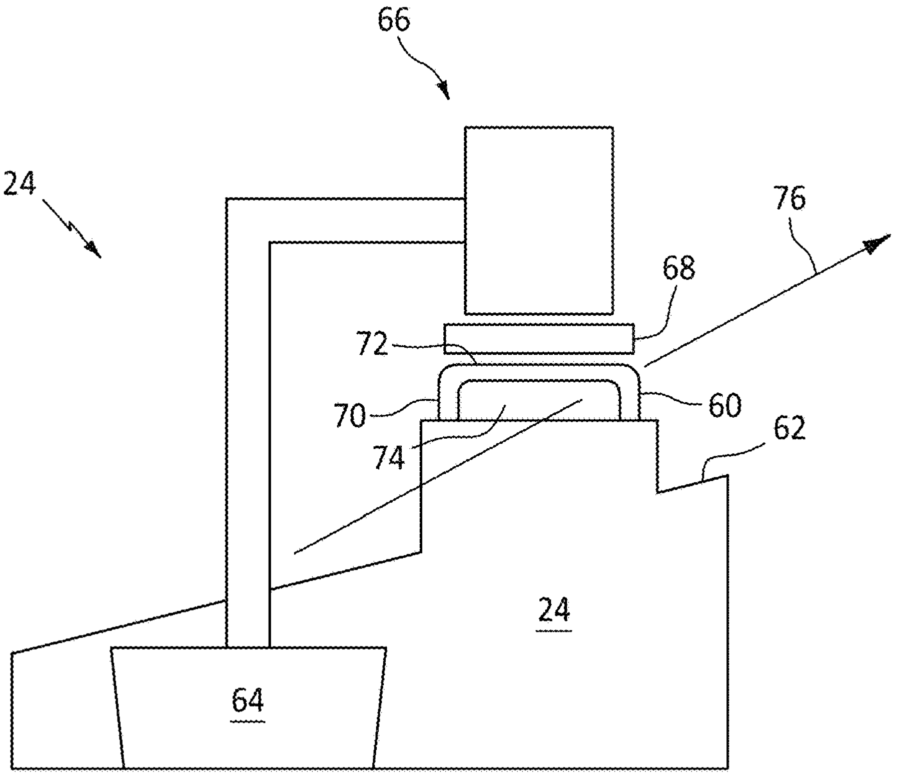
FIG. 4 is a schematic representation of an exemplary sync ring mounted on a bumper pad mounted on a case.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent to the rotatable airfoils. The rotatable airfoils and vanes are schematically indicated at 47 and 49.

Referring also to FIGS. 2 through 5, an exemplary case mounted bumper pad 60 is shown. The case mounted bumper pad or simply bumper pad 60 is in operative communication with the compressor section case 62. The compressor section 24 can include a compressor variable vane 64. The variable vane 64 can be actuated by a sync ring 66. The sync ring 66 can be mounted on the bumper pad 60 mounted on the case 62.

A runner pad 68 can be placed between the sync ring 66 and the bumper pad 60. The runner pad 68 can be made of low friction materials, such as polyimide composite material.

The bumper pad 60 includes a case contact region 70 supporting a runner pad support 72. The case contact region 70 is in operative communication with the case 62. The runner pad support 72 is in operative communication with the runner pad 68.

The bumper pad 60 includes a cooling gap or simply gap 74. The gap 74 is configured to allow cooling air 76, such as bypass air, to enter into and/or pass through the gap 74 and provide for the removal of thermal energy Q from the bumper pad 60.

The bumper pad 60 can be configured to reduce the heat transfer from the case 62 to the runner pad 68. The runner pad 68 can avoid being heated to predetermined temperatures, such as a thermal oxidation temperature, for example between 400 to 500 degrees Fahrenheit. The thermal oxidation temperature can be a temperature at which the materials begin oxidation which can lead to material degradation. The bumper pad 60 configuration can include sizing the cooling gap 74 to prevent the temperature of the runner pad 68 from obtaining the predetermined temperature and maintain the runner pad within a durability range and thus avoid unwanted material degradation in the runner pad 68.

Figure 5:
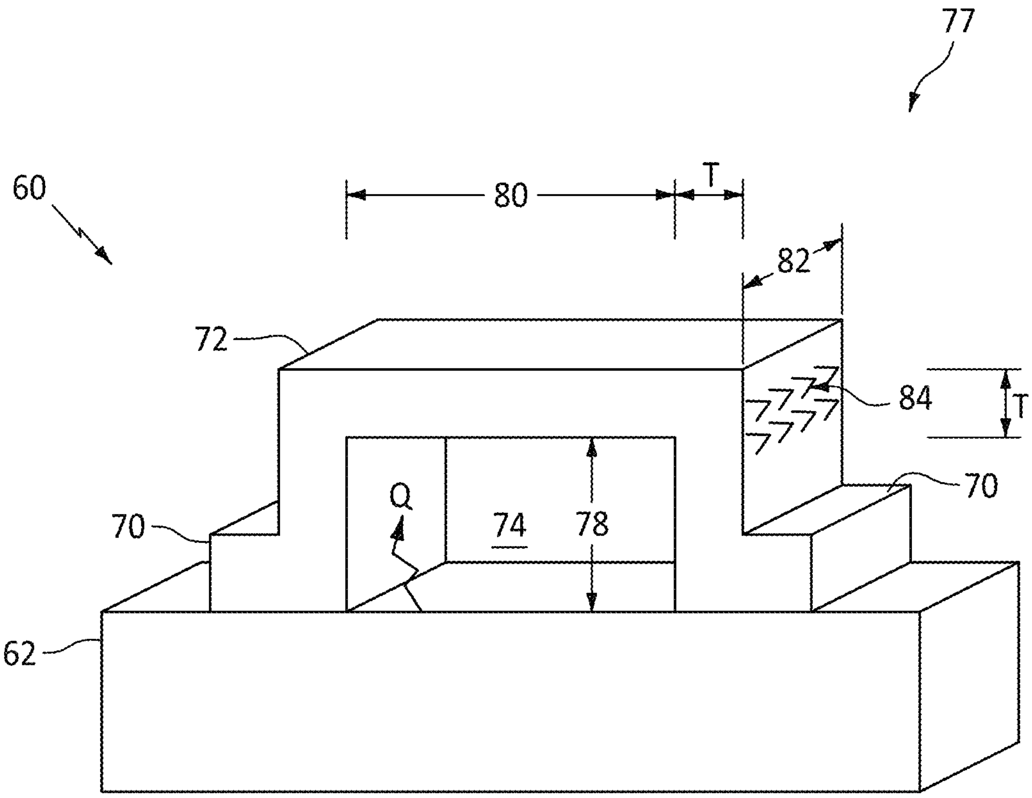
FIG. 5 is a schematic representation of an exemplary bumper pad mounted on a case.

FIG. 5 shows bumper pad dimensions 77 configured to cool the bumper pad 60. The dimensions 77 can include a gap height 78. The gap height 78 can be tailored to allow for a predetermined quantity of cooling air 76 flow to provide sufficient cooling to the bumper pad 60 and remain below the predetermined temperature. The gap 74 can have a width 80 that is also sized appropriately to accommodate the cooling air 76 flow for adequate cooling. The gap 74 can have a depth 82 sized appropriately to accommodate the cooling air 76 flow for adequate cooling.

The bumper pad 60 can include a thickness dimension T that is configured to provide sufficient structural support to the runner pad 68 and sync ring 66 while also controlling the heat transfer to the runner pad 68. In an exemplary embodiment the bumper pad 60 can include a bumper pad surface feature 84 formed in the bumper pad 60, such as in the gap 74. The surface feature 84 can be configured to increase surface area of the bumper pad 60 exposed to the cooling air 76 to enhance cooling rates. The surface feature 84 can be configured to reduce the surface contact temperature of the composite runner pad 68.

The bumper pad 60 materials of construction can be configured to provide the structural support as well as the heat transfer properties needed to properly function. The bumper pad 60 can include materials such as typical aerospace materials, Inconel, cobalt, electro-graphitic carbon, plastic, PTFE, and combinations thereof.

A technical advantage of the disclosed case mounted bumper pad includes providing a cooled bumper pad on the case resulting in a cooler composite runner pad (which is mounted to the sync ring).

Another technical advantage of the disclosed case mounted bumper pad includes a bumper pad height that is increased to improve cooling by allowing more air to flow under and around the bumper pad.

Another technical advantage of the disclosed case mounted bumper pad includes a cooled bumper pad which facilitates a composite operating temperature to be within a durability range.

Another technical advantage of the disclosed case mounted bumper pad includes a bumper pad configured for cooling the runner surface by convection and reduced conduction.

Another technical advantage of the disclosed case mounted bumper pad includes a bumper pad height configured to rapidly drop the surface temperature.

Another technical advantage of the disclosed case mounted bumper pad includes cooling fins which can further reduce the surface contact temp of the composite runner.

There has been provided a case mounted bumper pad. While the case mounted bumper pad has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A case mounted bumper pad comprising:

a case contact region supporting a runner pad support;

the case contact region is in operative communication with the case, the runner pad support is in operative communication with a runner pad, the runner pad is in operative communication with a sync ring of a variable vane; and a gap formed in the bumper pad proximate the case; wherein the gap is configured to prevent the runner pad from being heated to a predetermined temperature, the predetermined temperature comprises a thermal oxidation temperature of the runner pad; wherein the gap comprises dimensions tailored for a predetermined quantity of cooling air flow rate to cool the bumper pad; wherein the dimensions comprise at least one of a gap height, a gap width, and a gap depth configured for a predetermined quantity of cooling air flow through the gap.

2. The case mounted bumper pad according to claim 1, wherein the gap is configured to accommodate cooling air in the gap and provide for the removal of thermal energy from the bumper pad.

3. The case mounted bumper pad according to claim 1, wherein the bumper pad is configured to reduce the heat transfer from the case to the runner pad.

4. A gas turbine compressor section case mounted bumper pad comprising:

a compressor variable vane in operative communication with a sync ring; the sync ring mounted on the bumper pad; the bumper pad mounted on the case;

a runner pad between the sync ring and the bumper pad;

the bumper pad comprising a case contact region supporting a runner pad support;

the case contact region is in operative communication with the case, the runner pad support is in operative communication with the runner pad, the runner pad is in operative communication with the sync ring of the variable vane; and a gap formed in the bumper pad proximate the case; wherein the gap is configured to prevent the runner pad from being heated to a thermal oxidation temperature of the runner pad.

5. The gas turbine compressor section case mounted bumper pad according to claim 4, wherein the gap is configured to flow cooling air to pass through the gap and provide for the removal of thermal energy from the bumper pad.

6. The gas turbine compressor section case mounted bumper pad according to claim 4, wherein the gap comprises dimensions tailored to allow for a predetermined quantity of cooling air flow rate for cooling to the bumper pad.

7. The gas turbine compressor section case mounted bumper pad according to claim 4, further comprising:

a surface feature formed in the bumper pad, wherein the surface feature is configured to increase surface area of the bumper pad exposed to a cooling air flow.

8. The gas turbine compressor section case mounted bumper pad according to claim 4, wherein the bumper pad comprises a thickness dimension configured to provide structural support to the runner pad and the sync ring; and the bumper pad comprises material properties configured with a predetermined heat transfer rate to the runner pad.

9. A process of forming a gas turbine compressor section case mounted bumper pad comprising:

placing a compressor variable vane in operative communication with a sync ring;

mounting the sync ring on the bumper pad;

mounting the bumper pad on the case;

coupling a runner pad between the sync ring and the bumper pad;

the bumper pad comprising a case contact region supporting a runner pad support;

coupling the case contact region in operative communication with the case;

coupling the runner pad support in operative communication with the runner pad;

coupling the runner pad in operative communication with the sync ring of the variable vane; and forming a gap in the bumper pad proximate the case;

forming the bumper pad with dimensions comprising at least one of a gap height, a gap width, and a gap depth configured for a predetermined quantity of cooling air flow through the gap.

10. The process of claim 9, further comprising:

configuring the gap to flow cooling air passing through the gap; and providing for the removal of thermal energy from the bumper pad.

11. The process of claim 9, further comprising:

configuring the gap to prevent the runner pad from being heated to a predetermined temperature.

12. The process of claim 9, further comprising:

tailoring the gap with dimensions allowing for a predetermined quantity of cooling air flow for cooling to the bumper pad.

13. The process of claim 9, further comprising:

forming the bumper pad with a thickness dimension configured to provide structural support to the runner pad and the sync ring; and configuring the bumper pad with a material property having a predetermined heat transfer rate to the runner pad.

14. The process of claim 9, further comprising:

forming a surface feature in the bumper pad;

configuring the surface feature to increase surface area of the bumper pad exposed to a cooling air flow.

* * * * *